United States Patent [19]

Nakamura et al.

[11] Patent Number: 4,897,457

[45] Date of Patent: Jan. 30, 1990

[54] NOVEL FLUORINE-CONTAINING CYCLIC POLYMER

[75] Inventors: Masaru Nakamura, Tokyo; Isamu Kaneko, Yamato; Kazuya Oharu, Yokohama; Gen Kojima, Machida; Masashi Matsuo, Yokohama; Shunichi Samejima, Tokyo; Motoi Kamba, Yokohama, all of Japan

[73] Assignee: Asahi Glass Company Ltd., Tokyo, Japan

[21] Appl. No.: 233,820

[22] Filed: Aug. 10, 1988

[30] Foreign Application Priority Data

Aug. 14, 1987 [JP] Japan .................................. 62-201864

[51] Int. Cl.$^4$ .............................................. C08F 16/24
[52] U.S. Cl. ...................................... 526/247; 526/252
[58] Field of Search ................................. 526/247, 252

[56] References Cited

U.S. PATENT DOCUMENTS

| | | | |
|---|---|---|---|
| 3,084,144 | 4/1963 | Crawford | 260/87.7 |
| 3,274,265 | 9/1966 | Tatlow et al. | 260/648 |
| 3,418,302 | 12/1968 | Darby | 526/236 |
| 4,209,635 | 6/1980 | Murekata et al. | 560/183 |

FOREIGN PATENT DOCUMENTS 1106344 3/1968 United Kingdom .

*Primary Examiner*—Joseph L. Schofer
*Assistant Examiner*—N. Sarofim
*Attorney, Agent, or Firm*—Oblon, Spivak, McClelland, Maier & Neustadt

[57] ABSTRACT

A fluorine-containing thermoplastic resinous polymer which consist essentially of a group (a) of repeating units of a cyclic structure to be represented by the following general formula:

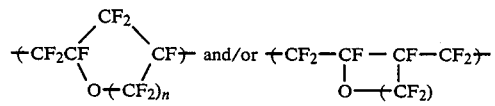

(where: n is an integer of 1 to 2); the polymer having a molecular weight such that the intrinsic viscosity thereof may become at least 0.1.

A fluorine-containing thermoplastic resinous polymer which consists essentially of:
(i) a group (a) of repeating units to be represented by the following general formula:

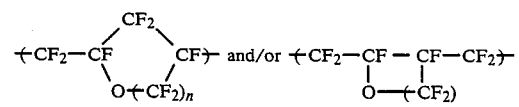

(where: n is an integer of 1 or 2), and
(ii) a group (b) of repeating units to be represented by the following general formula:

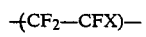

(where: X is selected from fluorine, chlorine. O—CF$_2$CF$_2$CF$_3$, O—CF$_2$CF(CF$_3$)OCF$_2$CF$_2$SO$_2$F, and O—CF$_2$CF$_2$CF$_2$COOCH$_3$)
the polymer containing therein at least 80% by weight of the group of repeating units (a), and having a molecular weight such that the intrinsic viscosity thereof may be become at least 0.1.

15 Claims, No Drawings

NOVEL FLUORINE-CONTAINING CYCLIC POLYMER

This invention relates to a novel fluorine-containing cyclic polymer, and, more particularly, it is concerned with a thermoplastic resinous fluorine-containing cyclic polymer having a particular asymmetrical cyclic structure in the main chain thereof.

With regard to the cyclic polymerization of hydrocarbon-type monomers, there have been done various researches, and a multitude of reports have been known in general, inclusive of three-membered cyclic polyether to large-membered cyclic polyether.

On the other hand, there have been known various fluorine-containing polymers, of which polytetrafluoroethylene and many others are already practically put into industrial use.

However, most of these fluorine-containing polymers contain therein the main chain in straight form based on vinyl monomer such as fluoro-olefin, (meth)acrylate having the fluoro-alkyl group in its side chain, etc.

There is very few example of polymer to be obtained by cyclic polymerization of a fluorine-type monomer, and it has only been known that a compound of a general formula: $CF_2=CF(CF_2)_xCF=CF_2$ (where: x is an integer of from 1 to 3) undergoes the cyclic polymerization by the γ-rays (vide: L. A. Waal, Fluoropolymer, Wiley-Science, 4, High Pressure Polymerization, p 127). It has also been known that a compound represented by the following general formula: $CF_2=CF-CF_2-CFCl-CF_2CF=CF_2$ is polymerized to yield a transparent and highly elastic film which is excellent in its heat-resistance and oxidation-resistance (vide: D. S. Ballantine et at., U.S. Atomic Energy Commission, BNL-296 (T-50) 18, 1954). However, all these polymers do not contain the ether bond in its principal chain, on account of which they can not be said to be necessarily satisfactory in their transparency and flexibility.

Moreover, British patent specification No. 1,106,344, U.S. Pat. No. 3,418,302, and others described fluorine-containing cyclic polymers which contain in the main chain thereof a cyclic structure having the ether bond to be represented by the following general formula:

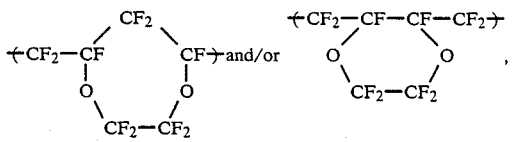

the polymers being produced by polymerization in a thin solution of perfluorodimethylene-bis(perfluorovinyl ether) as the starting material. This cyclic structure in the main chain of the polymer is, however, symmetrical, hence difficulty is accompanied in its synthesis. There is also apprehension such that the polymer is defectively inferior in its solubility and transparency.

It is therefore an object of the present invention to provide a novel fluorine-containing thermoplastic resinous polymer having in the main chain thereof an asymmetrical cyclic structure having the ether bond, which has not been known heretofore.

With a view to solving the above-described problems inherent in the conventional fluorine-containing cyclic polymers, the present invention provides the novel fluorine-containing thermoplastic resinous polymers, as follows:

*a fluorine-containing thermoplastic resinous polymer which consists essentially of a group (a) of repeating units of a cyclic structure to be represented by the following general formula:

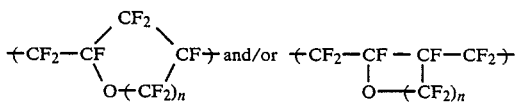

(where: n is an integer of 1 or 2), said polymer having a molecular weight such that the intrinsic viscosity of the polymer become at least 0.1;

*a fluorine-containing thermoplastic resinous polymer which consists essentially of:

(i) a group (a) of repeating units to be represented by the following general formula:

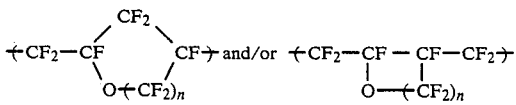

(where: n is an integer of 1 or 2); and (ii) a group (b) of repeating unit to be represented by the following general formula:

$$CF_2-CFX$$

(where: X is selected from fluorine, chlorine, $O-CF_2CF_2CF_3$, $O-CF_2CF(CF_3)OCF_2CF_2SO_2F$, and $O-CF_2CF_2CF_2COOCH_3$), said polymer containing therein at least 80% by weight of the group (a) of repeating units, and having a molecular weight such that the intrinsic viscosity of the polymer become at least 0.1.

The group (a) of the repeating units according to the present invention can be obtained by fluorination of a partially fluorinated vinyl ether, for example, $CF_2=CF-O-CF_2CF_2-CH=CH_2$, after it has been subjected to the cyclic polymerization. Preferably, however, the group (a) of the repeating units can be obtained by subjecting perfluoroallyl vinyl ether (hereinafter abbreviated as "PAVE") or perfluorobutenyl vinyl ether (hereinafter abbreviated as "PBVE"), which is represented by the following general formula:

$$CF_2=CF-O(CF_2)_nCF=CF_2$$

(where: n is an integer of 1 or 2) to the radical cyclic polymerization. In more detail, when PAVE is subjected to the radical polymerization, there is obtained the group (a) of the repeating units, wherein n=1, and, when PBVE is subjected to the radical polymerization, there is obtained the group (a) of the repeating units, wherein n=2.

This discovery is very surprising, because perfluorodiolefin which has so far been known yields a cross-linked polymer in general, while perfluorodimethylene-bis(perfluorovinyl ether), etc. yields a soluble polymer containing the cyclic structure in its main chain, only when it is polymerized in a thin solution.

PAVE is described in Japanese Patent Publication No. 45619/1985. PBVE can be synthesized by dechlorination of $CF_2=CF-O-CF_2-CF_2-CClF-CClF_2$ with use of zinc.

More surprising is that PAVE and PBVE are copolymerizable at an arbitrary ratio, hence there can be obtained a copolymer having the repeating units of n=1, n=2 at an arbitrary ratio.

The polymer which contains therein the group (a) of these repeating units is a transparent resin and is soluble in a fluorine type solvent such as perfluoro(2-butyltetrahydrofuran). Also, from the measurement of the infrared ray absorption spectrum, there can be recognized no absorption in the vicinity of 1790 cm$^{-1}$ due to the double bond.

Incidentally, the preferred cyclic structure to be obtained are those five-membered and six-membered ring structures which has less distortion.

Furthermore, perfluorovinyl ether to be represented by the general formula: $CF_2=CF-O(CF_2)_nCF=CF_2$ (where: n is an integer of 1 or 2) is radically copolymerized with a comonomer to be represented by the following general formula: $CF_2=CFX$ (where: X is selected from fluorine, chlorine, $O-CF_2CF_2CF_3$, $O-CF_2CF(CF_3)OCF_2CF_2SO_2F$, and $O-CF_2CF_2CF_2COOCH_3$) to thereby yield a copolymer which consists essentially of:

(i) a group (a) of repeating units of the cyclic structure to be represented by the following general formula:

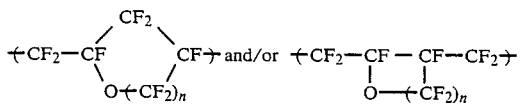

(where: n is an integer of 1 or 2); and (ii) a group (b) of repeating units to be represented by the following general formula:

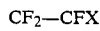

(where: X is selected from fluorine, chlorine $O-CF_2CF_2CF_3$, $O-CF_2CF(CF_3)OCF_2CF_2SO_2F$, and $O-CF_2CF_2CF_2COOCH_3$).

The comonomer to be represented by the following general formula has already been known:

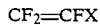

(where: X is selected from fluorine, chlorine, $O-CF_2CF_2CF_3$, $O-CF_2CF(CF_3)OCF_2CF_2SO_2F$, and $O-CF_2CF_2CF_2COOCH_3$).

In order to obtain a transparent and solvent-soluble polymer, it is preferable that 80% by weight or more of the group (a) of the repeating units be contained in the polymer. In case the content of this group (a) of the repeating units is less than 80% by weight, the resin loses its transparency, solvent-solubility and mechanical strength.

Molecular weight of this polymer should preferably be such that its intrinsic viscosity may become 0.1 or above. When the intrinsic viscosity is below 0.1, the mechanical strength of the resin becomes impractically low.

As the method for polymerization of these polymers, there may be employed the radical polymerization. That is to say, the polymerization method is not at all restricted to any specific one, provided that the polymerization proceeds radically. Examples are those polymerizations, in which use is made of an inorganic radical initiator, light rays, ionizing radiation, or heat. The polymerization method is also not particularly limited, and there may be used the bulk-polymerization, solution-polymerization, suspension-polymerization, and emulsion-polymerization.

Molecular weight of the polymer is controllable depending on polymerization temperature, concentration of the initiator, and so on. A chain transfer agent may also be used.

The polymerization composition of the copolymer can be controlled by the charging ratio of each and every comonomer to be used for the polymerization.

Depending on the kind of comonomers to be used and the rate of polymerization, it is possible to regulate the properties of the copolymer resin to be obtained, such as solubility, glass transition point, rupture strength, elongation, yield stress, modulus of elasticity, adhesive to base material, and so forth. Also, depending on the kind of the comonomer, it is possible to control the polymerization speed during the polymerization.

Use of tetrafluoroethylene for the comonomer makes it possible to lower the glass transition temperature of the resulting copolymer and to increase the polymerization speed. Addition of chlorotrifluoroethylene to the comonomer causes solubility of the copolymer to vary. Use of $CF_2=CF-O-CF_2CF_2CF_3$ as the comonomer improves elongation of the resulting copolymer. When use is made of $CF_2=CF-O-CF_2CF(CF_3)-O-CF_2CF_2SO_2F$ or $CF_2=CF-O-CF_2CF_2CF_2COOCH_3$ as the comonomer, adhesivity of the resulting copolymer to the base material would increase. It is of course feasible to use two or more kinds of the comonomers.

The polymer consisting of these groups (a) and (b) of the repeating units is transparent, and soluble in those fluorine type solvents such as perfluoro(2-butyltetrahydrofuran), etc. Also, measurement of the infrared ray absorption spectrum reveals no absorption taken place in the vicinity of 1790 cm$^{-1}$ due to the double bond. The composition of the copolymer is determined by the $^{19}F$—NMR spectrum measurement and the elementary analyses. Incidentally, the preceeding explanations are only for assisting the good understanding of the present invention, hence it goes without saying that they are not intent on limiting the scope of the present invention.

In the following, the present invention will be explained in further details in reference to preferred and actual examples thereof. It should also be understood that these examples are only illustrative of the present invention and do not intend to limit the scope of the present invention.

EXAMPLE 1

30 g of PAVE and 0.3 g of diisopropyl peroxydicarbonate as the polymerization initiator were placed in an ampoule having an inner volume of 100 ml and made of pressure-resistant glass. After repetition of the degassing under freezing condition for two times, the polymerization was conducted for 16 hours at 25° C. The pressure during the polymerization was lower than the atmospheric pressure. After the polymerization reaction, there was obtained 4.5 g of a polymer.

Upon measurement of the infrared ray absorption spectrum of this polymer, there could be observed no absorption in the vicinity of 1790 cm$^{-1}$ to be derived from the double bond which was present in the starting monomeric substance. Further, when this polymer was dissolved in perfluorobenzene and its $^{19}$F—NMR spectrum was measured, there was obtained a spectrum which indicated to the following repeating structure.

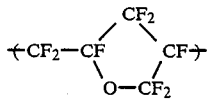

The intrinsic viscosity of this polymer $[\eta]$ was 0.50 at 30° C. in liquid which is composed principally of "FLORINATE FC-75" (a tradename for perfluoro(2-butyltetrahydrofuran) of 3M Corp., U.S.A. which will hereinafter be abbreviated as "FC-75"). This indicates that the polymer has high degree of polymerization.

The glass transition point of this polymer was 69° C. At a room temperature, this polymer indicated a state of its being tough and transparent glass. Further, its 10% thermal decomposition temperature was 462° C., which indicated that the polymer had high thermal stability. Furthermore, this polymer had colorless transparency, a low refractive index of 1.34, and a high light transmission factor of 95%.

The gas permeability coefficient of this polymer to various gasses was measured, the results of the measurement being shown in the following Table.

| Gas | Permeation Coefficient ($cm^3cm/cm^2$ sec. cm Hg) |
| --- | --- |
| He | $106 \times 10^{-10}$ |
| $H_2$ | $26 \times 10^{-10}$ |
| $CO_2$ | $8.2 \times 10^{-10}$ |
| $O_2$ | $3.9 \times 10^{-10}$ |
| $N_2$ | $0.81 \times 10^{-10}$ |
| $CH_4$ | $0.21 \times 10^{-10}$ |

EXAMPLE 2

10 g of PAVE, 10 g of trichlorotrifluoroethane (hereinafter abbreviated as "R-113"), and 10 mg of diisopropylperoxydicarbonate as the polymerization initiator were placed in an ampoule having an inner volume of 50 ml and made of pressure-resistant glass. After repetition of the degassing under freezing condition for two times, the polymerization was conducted for 14 hours at 40° C. The pressure during the polymerization was lower than the atmospheric pressure. As the result, there was obtained 6.1 g of a polymer.

The intrinsic viscosity of this polymer $[\eta]$ was 0.37 at 30° C. in "FC-75", hence the resulted polymer was found to have a high molecular weight. It was also discovered from the $^{19}$F—NMR spectrum measurement that the polymer was similar to that obtained in Example 1 above.

EXAMPLE 3

30 g of PAVE and 10 mg of the polymerization initiator

were placed in an ampoule having an inner volume of 50 ml and made of pressure-resistant glass. After repetition of the degassing under freezing condition for two times, the polymerization was conducted for 16 hours at 30° C. The pressure during the polymerization was lower than the atmospheric pressure. After the polymerization reaction, there was obtained 16 g of a polymer.

The intrinsic viscosity of this polymer $[\eta]$ was 0.505 at 30° C. in "FC-75".

EXAMPLE OF SYNTHESIS 1

(Synthesis of $CF_2=CFCF_2CF_2OCF=CF_2$)

2,000 g of $CF_2ClCFClCF_2COF$ was reacted with hexafluoropropyleneoxide in the presence of cesium fluoride, and was further converted into potassium salt thereof by use of potassium hydroxide, after which the substance was subjected to thermal decomposition, thereby obtaining $CF_2ClCFClCF_2CF_2OCF=CF_2$ as the product. Subsequently, this product was reacted with a mixture of Zn and dioxane to carry out dechlorination, thereby obtaining 300 g of $CF_2=CFCF_2CF_2OCF=CF_2$ (PBVE) having boiling point of 64° C. The structure of this fluorine-containing monomer was verified by measurement of $^{19}$F—NMR spectrum.

EXAMPLE 4

5.42 g of PBVE as obtained in the above-described Example of Synthesis 1 and 10 mg of the polymerization initiator

were placed in an ampoule having an inner volume of 50 ml and made of pressure-resistant glass. After the degassing under freezing condition was repeated for two times, the polymerization reaction was conducted for 48 hours at 25° C. The pressure during the polymerization reaction was lower than the atmospheric pressure. From this polymerization reaction, there was obtained 2.22 g of a polymer.

When the infrared ray absorption spectrum of this polymer was measured, there could be observed no absorption in the vicinity of 1790 cm$^{-1}$ to be derived from the double bond which was present in the starting monomeric substance. Further, when this polymer was dissolved in perfluorobenzene and its $^{19}$F—NMR spectrum was measured, there was obtained a spectrum which indicated the following repeating structure.

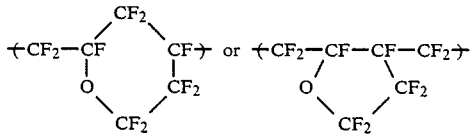

The intrinsic viscosity of this polymer $[\eta]$ was 0.55 at 30° C. in "FC-75", which indicated that this polymer had a high degree of polymerization.

The glass transition temperature of this polymer was 108° C. At a room temperature, this polymer indicated at state of its being tough and transparent glass. Also, it had 10% thermal decomposition temperature of 457° C., thus indicating its high thermal stability. By the way, this polymer was colorless transparent, and had its refractive index of as low as 1.34 and its light transmission factor of as high as 95%.

EXAMPLE 5

5 g of PAVE, 5 g of PBVE and 10 mg of the polymerization initiator

were placed in a glass reactor having an inner volume of 60 ml. After the degassing under freezing condition for two times, polymerization was conducted for 24 hours at 25° C., while agitating the reactants. The pressure during the polymerization reaction as lower than the atmospheric pressure. As the result, there was obtained 5.5 g of a polymer.

When the infrared ray absorption spectrum of this polymer was measured, there could be observed no absorption in the vicinity of 1790 cm$^{-1}$ to be derived from the double bond which was present in the starting monomeric substance. Further, this polymer was dissolved in perfluorobenzene and its $^{19}$F—NMR spectrum was measured to verify its structure. As the result, the obtained polymer was found to be a copolymer consisting of: a unit of the cyclic structure to be derived from PAVE such as represented by the following formula:

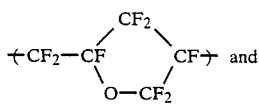

a unit of the cyclic structure to be derived from PBVE such as represented by the following formula:

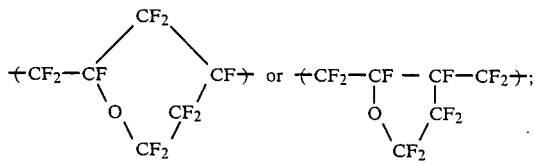

and containing therein 54% by weight of the unit of the cyclic structure to be derived from PAVE.

This polymer was found to have its intrinsic viscosity [η] of 0.44 at 30° C. in "FC-75", hence high degree of polymerization.

The glass transition point of this polymer was 91° C. and indicated a state of its being tough and transparent glass at a room temperature. Further, its 10% thermal decomposition temperature was 435° C., thus indicating that the polymer had high thermal stability. Furthermore, this polymer was colorless transparent, and had its refractive index of as low as 1.34 and its light transmission factor of as high as 95%.

EXAMPLE 6

5 g of PAVE, 15 g of "R-113", and 80 mg of 5 wt % solution of the polymerization initiator

were placed in an ampoule having an inner volume of 100 ml and made of pressure-resistant glass. After repetition of the degassing under freezing condition for three times, 0.5 g of CF$_2$=CF$_2$ was charged into the reaction system. While shaking the ampoule in an incubator, the polymerization was conducted for six hours at 30° C., as the result of which a solid substance was obtained in quantity of 1.5 g .

The thus obtained solid substance was dissolved in perfluorobenzene, and its structure was verified by measurement of $^{19}$F—NMR spectrum, from which it was found that the resulted polymer was a copolymer consisting of: a unit of the cyclic structure to be derived from PAVE as represented by the following formula:

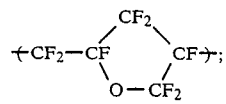

and a unit of the structure to be derived from CF$_2$=CF$_2$ as represented by the following formula:

and containing therein 81% by weight of the unit of the cyclic structure to be derived from PAVE. Also, this polymer had its intrinsic viscosity [η] of 0.425 at 30° C. in "FC-75".

EXAMPLE 7

20 g of PBVE obtained in Example of Synthesis 1 and 40 mg of the polymerization initiator

were placed in an ampoule having an inner volume of 200 ml and made of pressure-resistant glass. After repetition of the degassing under freezing condition for two times, 1.0 g of CF$_2$=CFCl was charged into the reaction system. While shaking the ampoule in an incubator, the polymerization reaction was conducted for 10 hours at 25° C. As the result, there was obtained a polymer in a quantity of 4.5 g.

Upon measurement of the infrared ray absorption spectrum of this polymer, it was found that there was no absorption in the vicinity of 1790 cm$^{-1}$ due to the double bond which was present in the starting monomeric substance. Further, this polymer was dissolved into perfluorobenzene, and its structure was verified by measurement of the $^{19}$F—NMR spectrum. As the result, the thus obtained polymer was found to be a copolymer consisting of: a unit of the cyclic structure to be derived from PBVE such as represented by the following formula:

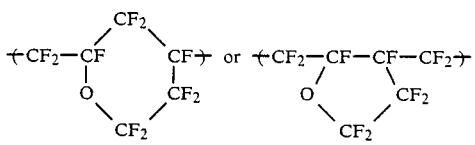

and a unit of the structure to be derived from CF$_2$=CFCl as represented by the following formula:

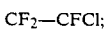

and containing therein 84% by weight of the unit of the cyclic structure to be derived from PBVE. This polymer had its intrinsic viscosity of 0.43 in "FC-75" at 30° C., thus indicating that it had high degree of polymerization.

The polymer was in a state of its being tough and transparent glass at a room temperature. It had also a 10% thermal decomposition temperature of 421° C., which showed that it had high thermal stability. Further, the polymer showed its solubility in a mixed solution of "FC-75" and "R-113".

EXAMPLE 8

20 g of PBVE obtained in Example of Synthesis 1 above and 20 mg of the polymerization initiator

were placed in an ampoule having an inner volume of 200 ml and made of pressure-resistant glass. After repetition of the degassing under freezing condition for two times, 0.5 g of $CF_2=CF_2$ was charged in the reaction system. While shaking this ampoule in an incubator, the polymerization reaction was conducted for five hours at a temperature of 25° C. As the result, there was obtained 5.8 g of a polymer.

Upon measurement of the infrared ray absorption spectrum of this polymer, there could be observed no absorption in the vicinity of 1790 cm$^{-1}$ to be derived from the double bond which was present in the starting monomeric substance. Further, this polymer was dissolved in perfluorobenzene to measure its $^{19}F$—NMR spectrum, from which its structure was verified. As the result of this, the thus obtained polymer was found to be a copolymer consisting of: a unit of the cyclic structure to be derived from PBVE such as represented by the following formula:

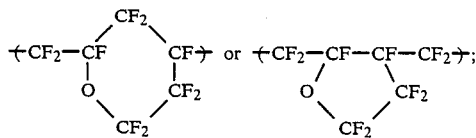

and a unit of the structure to be derived from $CF_2=CF_2$ as represented by the following formula:

$CF_2$—$CF_2$, and containing therein 94% by weight of the unit of the cyclic structure to be derived from PBVE. Further, this polymer had its intrinsic viscosity [$\eta$] of 0.53 in "FC-75" at 30° C., thus indicating that it had high degree of polymerization. It also indicated a state of its being a tough and transparent polymer at a room temperature.

EXAMPLE 9

9 g of PAVE, 1 g of $CF_2=CF$—$O$—$CF_2CF_2CF_2COOCH_3$, and 10 mg of the polymerization initiator

were placed in an ampoule having an inner volume of 50 ml and made of pressure-resistant glass. After repetition of the degassing under freezing condition for two times, the polymerization was conducted for 24 hours at a temperature of 25° C. The pressure during the polymerization reaction was lower than the atmospheric pressure. As the result, there was obtained 3.55 g of a polymer.

This polymer was dissolved in perfluorobenzene to measure its $^{19}F$—NMR spectrum, from which its structure was verified. As the result, the thus obtained polymer was found to be a copolymer consisting of a unit of the cyclic structure to be derived from PAVE such as represented by the following formula:

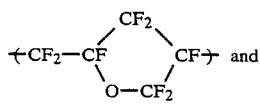 and a unit of the structure of the formula:

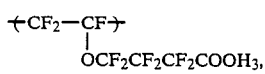

and containing therein 93% by weight of the unit of the cyclic structure to be derived from PAVE.

This polymer had its intrinsic viscosity [$\eta$] of 0.32 in "FC-75" at 30° C., thus indicating that it had a high degree of polymerization.

The polymer had its glass transition point of 64° C., and indicated a state of its being tough and transparent glass. Also, its 10% thermal decomposition temperature was 430° C., thus indicating that it had high thermal stability. Further, this polymer was colorless transparent.

EXAMPLE 10

40 g of PAVE, 5 g of $CF_2=CF$—$O$—$CF_2CF_2CF_2COOCH_3$, and 10 mg of diisopropyl peroxydicarbonate as the polymerization initiator were placed in an ampoule having an inner volume of 100 ml and made of pressure-resistant glass. After repetition of the degassing under freezing condition for two times, 5 g of $CF_2=CF_2$ was charged into the reaction system. While shaking this ampoule in an incubator, the polymerization was conducted for 72 hours at a temperature of 30° C. As the result, there was obtained 11.8 g of a polymer.

This polymer was dissolved in perflurobenzene to measure its $^{19}F$—NMR spectrum, from which its structure was verified. As the result, the thus obtained polymer was found to be a copolymer consisting of: a unit of the cyclic structure to be derived from PAVE such as represented by the following formula:

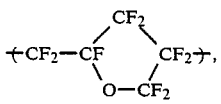

and units of the formulas:

derived from $CF_2=CF$—$O$—$CF_2CF_2CF_2COOCH_3$ and $CF_2=CF_2$, respectively, and containing therein 82% by weight of the unit of the cyclic structure to be derived from PAVE.

This polymer had its intrinsic viscosity [η] of 0.42 in "FC-75" at 30° C., thus indicating that it had high degree of polymerization.

The polymer was found to have its glass transition point of 58° C., and indicated a state of its being tough and transparent polymer at a room temperature. Further, its 10% thermal decomposition temperature was 421° C., thus indicating that it had high thermal stability. Furthermore, the polymer was colorless transparent.

EXAMPLE 11

8 g of PBVE, 1 g of $CF_2=CFOCF_2CF(CF_3)OCF_2CF_2SO_2F$ and 10 mg of the polymerization initiator

were placed in an ampoule having an inner volume of 50 ml and made of pressure-resistant glass. After repetition of the degassing under freezing condition for two times, polymerization was conducted for 24 hours at 25° C. The pressure during the polymerization reaction was lower than the atmospheric pressure. As the consequence, there was obtained 3.8 g of a polymer. This polymer was dissolved in perfluorobenzene to measure its $^{19}F$—NMR spectrum, from which its structure was verified. As the result, the thus obtained polymer was found to be a copolymer consisting of: a unit of the cyclic structure to be derived from PBVE such as represented by the following formula:

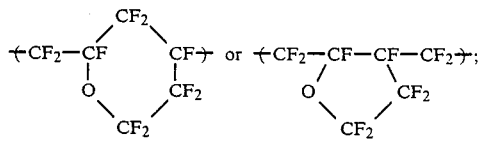

and a unit of the structure to be derived from $CF_2=CFOCF_2CF(CF_3)OCF_2CF_2SO_2F$ as represented by the following formula:

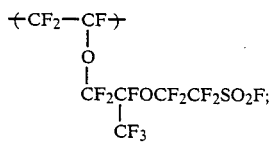

and containing therein 94% by weight of the structure to be derived from PBVE.

It was found that this polymer had its intrinsic viscosity [η] of 0.38 in "FC-75" at 30° C., thus indicating that it had high degree of polymerization.

The polymer had its glass transition point of 92° C., and indicated a state of its being tough and transparent glass. The polymer was colorless transparent. The adhesive property of this polymer with glass was satisfactory.

EXAMPLE 12

8 g of PAVE, 2 g of $CF_2=CF-O-CF_2CF_2CF_3$, and 10 mg of the polymerization initiator

were placed in an ampoule having an inner volume of 50 ml and made of pressure-resistant glass. After repetition of the degassing under freezing condition for two times, the polymerization was conducted for 24 hours at a temperature of 25° C. The pressure during the polymerization reaction was lower than the atmospheric pressure. As the result, there was obtained a polymer in a quantity of 1.85 g.

This polymer was dissolved in perfluorobenzene to measure its $^{19}F$—NMR spectrum, from which its structure was verified. As the consequence, the thus obtained polymer was found to be a copolymer consisting of: a unit of the cyclic structure to be derived from PAVE such as represented by the following formula:

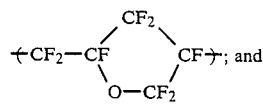

a unit of the structure to be derived from $CF_2=CF-O-CF_2CF_2CF_3$ as represented by the following formula:

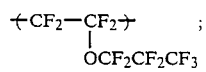

and containing therein 89% by weight of the unit of the cyclic structure to be derived from PAVE.

It was further found that this polymer had its intrinsic viscosity [η] of 0.35 in "FC-75" at 30° C., thus indicating that it had high degree of polymerization.

The polymer had its glass transition point of 61° C., and indicated a state of its being tough and transparent glass. Furthermore, its 10% thermal decomposition temperature was 415° C., thus indicating that the polymer had high thermal stability. Moreover, this polymer was colorless transparent, and showed its elongation of 250% at 25° C.

The fluorine-containing thermoplastic resinous polymer according to the present invention, containing therein the ether bond in its main chain which has not so far been known, can be readily subjected to press-molding, extrusion-molding, and injection-molding, and, when the polymer is molded into optical parts such as lenses, it exhibits remarkable effect such that the molded article is excellent in its transparency, with added superiority in its chemical-resistant property, electrical insulation, heat-stability, strong acid resistant property, strong alkali resistant property, water-resistant property, moisture-resistant property, and so forth. Further, the polymer according to the present invention possesses high transmissibility to the ultraviolet rays, which provides a remarkable effect such that it can substitute various sorts of optical parts made of quartz glass. Furthermore, since it has high transmissibility to the infrared rays, it can be effectively employed for various sorts of infrared ray sensors. Also, the polymer according to the present invention has a low refractive index, in account of which it exhibits an effect such that, when this polymer is prepared into a solution and coated on the surface of the optical parts such as lenses, the light reflection can be reduced. Moreover, the resinous polymer according to the present invention is recognized to be effectively and suitably applicable as the cladding material for the optical fibers, material for opto-magnetic discs, protective membranes for the solar batteries, gas-separating membranes, protective films for transparent resins such as acrylic resin, polycarbonate resin, and diethylene glycol-bis-(allylcarbonate) resin, etc., and treatment agent for textile materials.

We claim:

1. A fluorine-containing thermoplastic resinous polymer which consists essentially of (a) of repeating units of a cyclic structure represented by the following general formula:

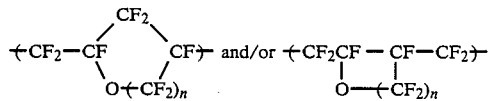

where n is an integer of 1 or 2,
said polymer having a molecular weight such that the intrinsic viscosity of the polymer is at least 0.1.

2. A polymer according to claim 1, wherein said (a) repeating units are repeating units of cyclically polymerized perfloroallyl vinyl ether and/or perfluorobutenyl vinyl ether.

3. A fluorine-containing thermoplastic resinous polymer which consists essentially of:
(i) (a) of repeating units represented by the following general formula:

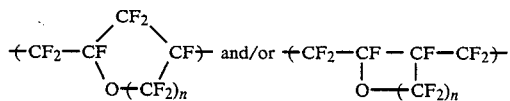

where n is an integer of 1 or 2, and
(ii) (b) of repeating units represented by the following general formula:

$CF_2$—$CFX$ where X is selected from fluorine, chlorine O—$CF_2CF_2CF_3$, O—$CF_2CF(CF_3)OCF_2CF_2SP_2F$, and —$CF_2CF_2CF_2COOH_3$,
said polymer containing therein at least 80% by weight of the repeating units (a), and having a molecular weight such that the intrinsic viscosity of the polymer is at least 0.1.

4. A polymer according to claim 3, wherein said (a) repeating units are repeating units of cyclically polymerized perfluoroallyl vinyl ether and/or perfluorobutenyl vinyl ether.

5. A polymer according to claim 3 or 4, wherein said (b) repeating units are repeating units of a copolymerized comonomer of the following general formula:

$CF_2$=$CFX$ where X is selected from fluorine, chlorine, O—$CF_2CF_2CF_3$, O—$CF_2CF(CF_3)OCF_2CF_2SP_2F$, and O—$CF_2CF_2CF_2COOCH_3$).

6. A fluorine-containing thermoplastic resinous polymer according to claim 2 wherein the repeating units are:

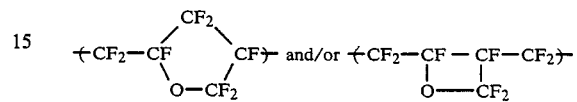

7. A fluorine containing thermoplastic resinous polymer according to claim 2 wherein the repeating units are:

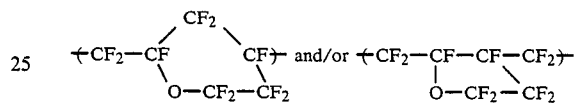

8. A polymer according to claim 2 which is a copolymer of cyclically polymerized perfluoroallyl vinyl ether and cyclically polymerized perfluorobutenyl vinyl ether.

9. A polymer according to claim 4 which is a copolymer of cyclically polymerized perfluoroallyl vinyl ether and of $CF_2$=$CF_2$.

10. A polymer according to claim 4 which is a copolymer of cyclically polymerized perfluorobutenyl vinyl ether and of $CF_2$=$CFCl$.

11. A polymer according to claim 4 which is a copolymer of cyclically polymerized perfluorobutenyl vinyl ether and of $CF_2$=$CF_2$.

12. A polymer according to claim 4 which is a copolymer of cyclically polymerized perfluoroallyl vinyl ether and of $CF_2$=$CF$—O—$CF_2CF_2CF_2COOCH_3$.

13. A polymer according to claim 4 which is a terpolymer of cyclically polymerized perfluoroallyl vinyl ether, of $CF_2$=$CF$—O—$CF_2CF_2CF_2COOH_3$ and of $CF_2$=$CF_2$.

14. A polymer according to claim 4 which is a copolymer of cyclically polymerized perfluorobutenyl vinyl ether and of $CF_2$=$CFOCF_2CF(CF_3)OCF_2CF_2SO_2F$.

15. A polymer according to claim 4 which is a copolymer of cyclically polymerized perfluoroallyl vinyl ether and of $CF_2$=$CF$—O—$CF_2CF_2CF_3$.

* * * * *